United States Patent [19]

Hendriks et al.

[11] 4,241,605
[45] Dec. 30, 1980

[54] FLOWMETER WITH MAGNETIC COUPLING

[75] Inventors: Henry L. Hendriks, La Puente; Avery Hinds, Pomona, both of Calif.

[73] Assignee: Envirotech Corporation, Menlo Park, Calif.

[21] Appl. No.: 48,428

[22] Filed: Jun. 14, 1979

[51] Int. Cl.³ ............................................. G01F 1/115
[52] U.S. Cl. .................................................. 73/861.94
[58] Field of Search .................... 73/229, 230, 231 R, 73/231 M, 185, 187, 189, 194 EM

[56] References Cited

U.S. PATENT DOCUMENTS

| | | | |
|---|---|---|---|
| 2,371,511 | 3/1945 | Faus | 172/284 |
| 2,770,131 | 11/1956 | Sparling | 73/231 R |
| 3,169,398 | 2/1965 | Sparling et al. | 73/231 R |
| 3,295,370 | 1/1967 | Marx | 73/231 R |
| 3,388,595 | 6/1968 | Last et al. | 73/231 R |
| 3,398,577 | 8/1968 | Kovats et al. | 73/231 R |
| 3,811,323 | 5/1974 | Swenson | 73/231 R |
| 3,972,233 | 8/1976 | Pelt et al. | 73/231 R |
| 4,140,013 | 2/1979 | Hunger | 73/229 |

*Primary Examiner*—Donald O. Woodiel
*Attorney, Agent, or Firm*—Hal Bohner; Robert Krebs

[57] ABSTRACT

A magnetic coupling is provided for a fluid flowmeter wherein the magnetic coupling includes a first and a second magnet assembly. The first magnet assembly includes a plurality of magnets coupled to the counter mechanism of the flowmeter, and the second magnet assembly includes a plurality of magnets coupled to the propeller. The two magnet assemblies are constructed and located so that they magnetically influence one another, and when the propeller rotates the second assembly, the first assembly is driven to rotate thereby driving the counter.

7 Claims, 11 Drawing Figures

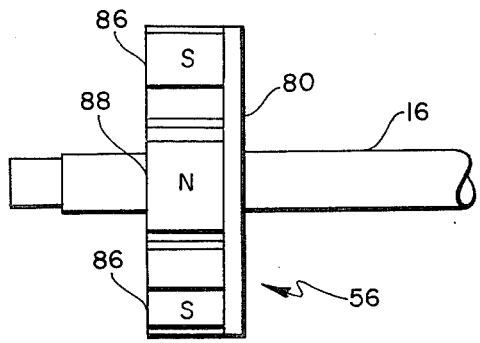
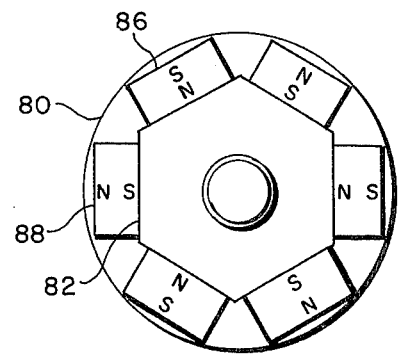
FIG. 3    FIG. 4
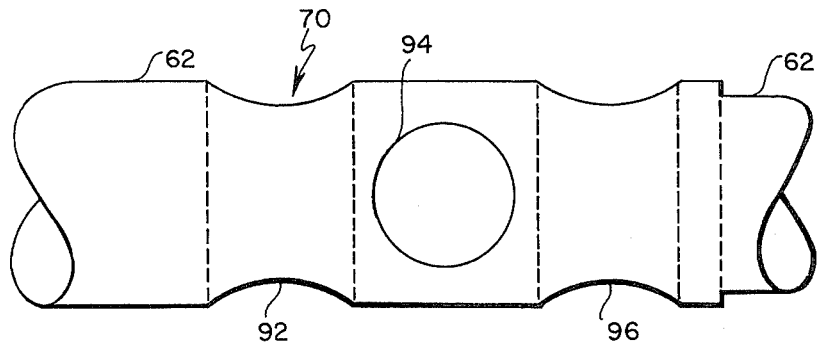
FIG. 5
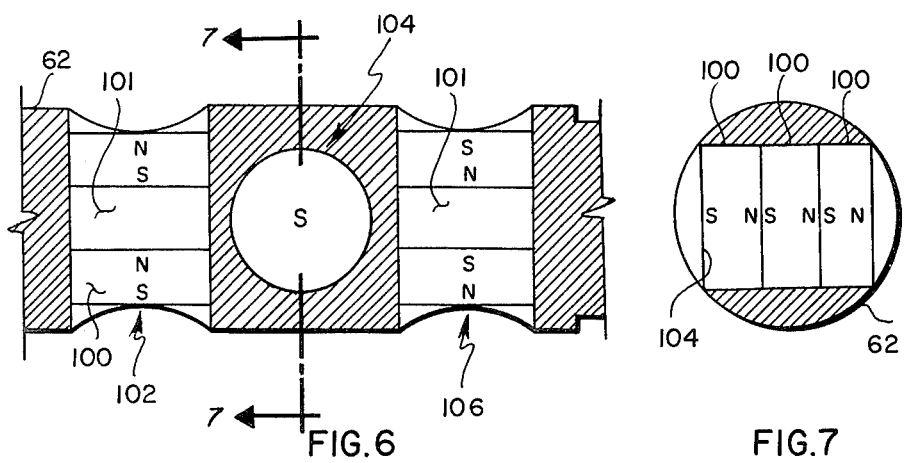
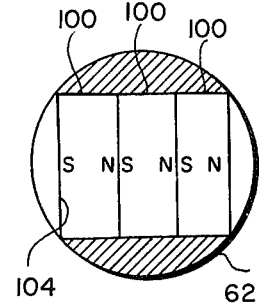
FIG. 6    FIG. 7

FLOWMETER WITH MAGNETIC COUPLING

BACKGROUND OF THE INVENTION

1. Field of the Invention

This invention relates to a magnetic coupling assembly for a propeller-operated fluid flowmeter.

2. State of the Art

It is known to employ magnetic coupling assemblies in the drive means connecting the propeller of a fluid meter to the register of the meter. For example, according to U.S. Pat. No. 3,398,577 to Kovats et al, a magnet is coupled to the shaft of the propeller to rotate with the propeller, and a second magnet is coupled to the shaft of the register mechanism to operate the register. A magnetic flux keeper is interposed between the first and second magnets to transfer the magnetic fields therebetween. Thus, the first and second magnets are located within the magnetic fields of one another so that motion of one magnet induces motion of the other.

Further, according to this patented system, the magnet coupled to the propeller shaft includes a single north and a single south pole; and likewise the magnet coupled to the register includes a single north and a single south pole. In operation, as the driving magnet on the propeller shaft rotates, the magnetic flux induces the magnet coupled to the register shaft to rotate due to attraction of opposite poles and repulsion of like poles. The driving magnet rotates one revolution for each revolution of the driven magnet.

For proper operation of a flowmeter employing magnetic coupling it is important that the register magnet rotate without "slipping" relative to the driving magnet. That is, if the propeller were able to rotate without causing commensurate rotation in the register unit, then inaccurate measurements of flow would be recorded. It has been found that liquid streams often contain substantial discontinuities such as air pockets or large particles of material. Such discontinuities can cause the propeller to experience substantial accelerations when they pass thereby. According to prior art systems of the type described in the aboveidentified patent, substantial accelerations of the propeller have been found to result in "slipping" between the driving magnet and the driven magnet.

It is also known that the flow rate of the liquid can be reduced due to the torque required to turn the propeller. In very small pipes this torque can be a substantial percentage of the energy in the flowing fluid. Therefore it is desirable to minimize the torque required to turn the propeller and drive the register.

OBJECTS OF THE INVENTION

An object of the present invention is to provide a propeller-type flowmeter having a magnetically-coupled register assembly wherein slipping between the driving system and the driven register is minimized.

Another object of the invention is to provide a magnetically-coupled register wherein the ratio of the number of revolutions of the driving magnet corresponding to the number of revolutions of the driven magnet can be easily and quickly varied.

Still another object is to provide an assembly wherein the torque required to turn the propeller, coupling and resistor is reduced to a minimum.

Further objects and advantages of the present invention may be readily ascertained from the following description and appended illustrations which are offered by way of illustration only and not in limitation of the invention, the scope of which is defined by the appended claims and equivalents.

BRIEF DESCRIPTION OF THE DRAWINGS

In the drawings:

FIG. 3 is a detail of one part of the device shown in FIGS. 1 and 2.

FIG. 4 is another view of the details shown in FIG. 3.

FIG. 5 is a detail of another part of the device shown in FIGS. 1 and 2.

FIG. 6 is a detail, partially cut away, of the elements shown in FIG. 5.

FIG. 7 is another detail, cut away along line 7—7, of the device shown in FIGS. 5 and 6.

DETAILED DESCRIPTION OF THE PREFERRED EMBODIMENTS

Figure 1:
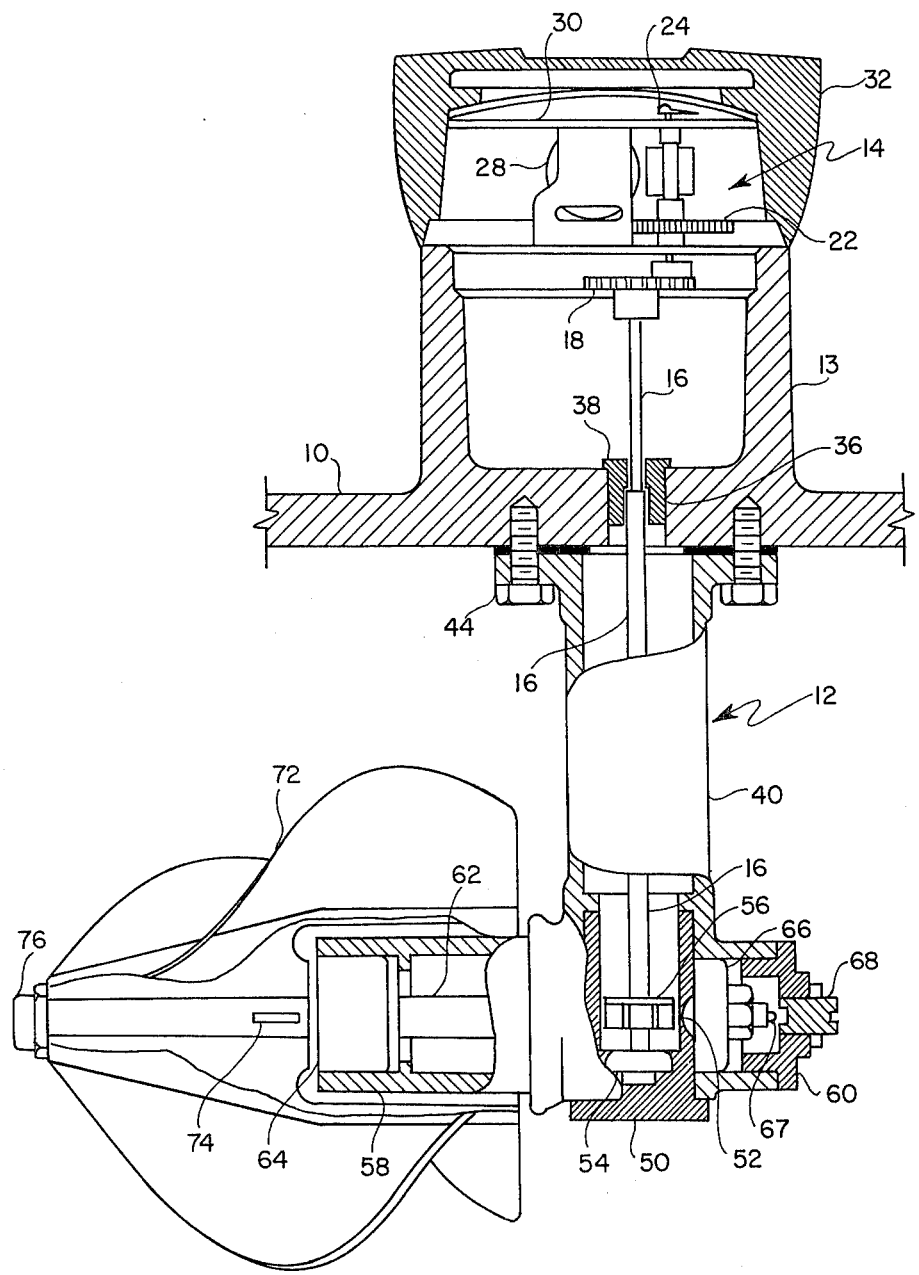
FIG. 1 is a diagram, partially cut away, of a flowmeter according to the preferred embodiment of the present invention.
Figure 2:
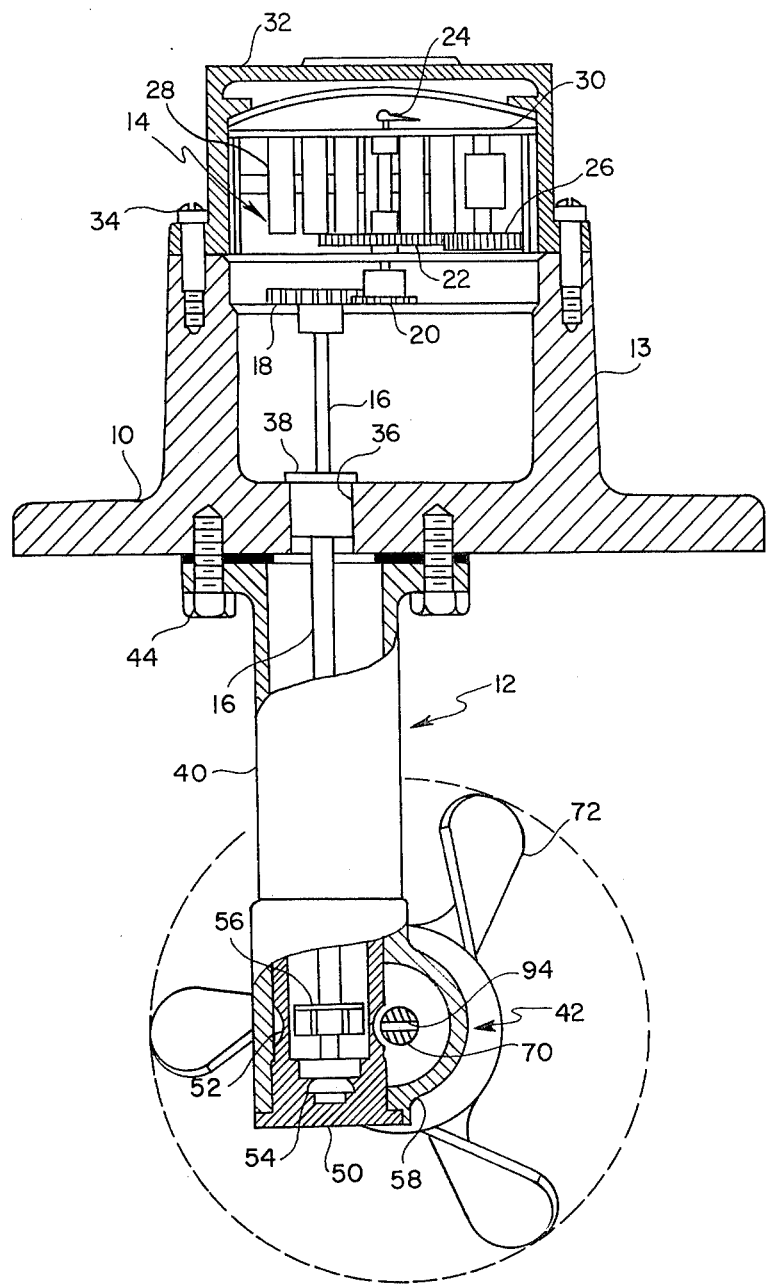
FIG. 2 is another view of the device shown in FIG. 1, also partially cut away.

The propeller-type meter according to FIGS. 1 and 2 includes a cover plate 10 which in the normal operation of the device is coupled to a pipe, not shown. The cover plate 10 has a flat lower side, and coupled to the lower side is a gear enclosure 12. On the upper side of the cover plate 10 is formed a circular, open-topped mounting box 13. The mounting box 13 is hollow to contain part of a counter assembly 14. The upper part of the counter assembly 14 is conventional and will not be described in detail.

Generally speaking, the counter assembly 14 includes a vertical shaft 16 which extends from the gear enclosure 12 upwardly into the mounting box 13. Disposed atop the vertical shaft 16 is a circular gear 18 which is affixed to the vertical shaft 16 for rotation in a horizontal plane. A second gear 20 is disposed for rotation in a horizontal plane to cooperate with gear 18. A gear 22 is coupled to gear 20, and an additional gear 26 is affixed to the counter assembly 14 to rotate in cooperation with gear 22. A pointer assembly 24 is coupled to the gear 22 to rotate at the same rate as the gear 22, and a clock register 28 is coupled to the gear 26. The pointer 24 and clock register 28 are conventional means to totalize flow in the flowmeter and register the total flow on a dial face 30 which comprises part of the counter assembly 14. A cover 32 is affixed to the mounting box 13 above the counter assembly 14 to protect the counter assembly while providing a means to view the pointer and the clock register 28. The cover 32 is affixed to the mounting box 13 by two screws 34.

Thus, it should be understood that in operation the vertical shaft 16 rotates thereby to rotate the gears in the counter assembly 14. The counter assembly 14 operates to totalize the number of revolutions of the vertical shaft 16 thereby to indicate the quantity of flow measured by the meter.

Affixed to the lower side of the cover plate 10 is the gear enclosure 12. A circular port 36 is formed in the cover plate 10 to provide communication between the interior of the mounting box 13 and the gear enclosure 12. A bearing 38 is affixed in the port 36 to retain the vertical shaft 16 for rotation.

The gear enclosure 12 includes a generally cylindrical, vertical member 40 and a generally cylindrical, horizontal member 42 affixed to the lower part of the vertical member 40. The upper end of the vertical member 40 includes flanges for coupling the vertical member 40 to the cover plate 10 by bolts 44. The vertical shaft 16 extends concentrically with the vertical member 40, and the bottom of the shaft 16 ends near the bottom of the vertical member 40. A plug 50 is sealingly fitted in the lower end of the vertical member 40 to prevent liquid from entering the vertical member and to support the shaft 16. The plug 50 is generally cylindrical, and has an annular indentation 52 located around its outside at about its vertical midpoint. The plug 50 is hollow to receive a vertical shaft bearing 54 and the lower end of the shaft 16. The vertical shaft bearing 54 is affixed to the lower end of the shaft 16 to permit the shaft to rotate while preventing vertical or horizontal motion of the shaft 16. A vertical magnet assembly 56 is affixed to the shaft 16 a short distance above the vertical shaft bearing 54 at substantially the same level as the annular indentation 52.

The gear enclosure 12 also includes a horizontal member 42 coupled to the lower end of the vertical member 40. The horizontal member 42 is substantially a horizontally-disposed hollow cylinder 58; however, at the coupling of the vertical member 40 and the horizontal member 42 the horizontal member 42 has a semi-circular configuration.

The horizontal member 42 enclosed a propeller shaft 62, and a propeller shaft plug assembly 60 is affixed to the right end of the horizontal member 42 to retain the shaft 62 within the horizontal cylinder. The propeller shaft 62 is located coaxially with the horizontal member 42, and the propeller shaft has annular bearings 64 and 66 affixed at its middle and its right end respectively to permit rotation of the propeller shaft 62. A dome 67 is formed on the right end of the propeller shaft 62, and a plug 68 is fitted in the plug assembly 60 so that the plug 68 and dome 67 cooperate to prevent any substantial motion of the shaft 62 toward the right.

As shown in FIG. 2, a horizontal magnet assembly 70 comprises part of the propeller shaft 62. The horizontal magnet assembly is located adjacent the vertical magnet assembly 56, and the two magnet assemblies 56 and 70 are separated by the plug 50 at its annular indentation 52.

A conventional propeller 72 is affixed to the left end of the propeller shaft 62. The propeller 72 is coupled to the shaft 62 by a key 74 and a nut 76 so that rotation of the propeller correspondingly rotates the propeller shaft 62.

It should be understood that the horizontal magnet assembly 70 and vertical magnet assembly 56 are constructed and arranged so that when the propeller 72 rotates, the vertical shaft 16 is thereby driven to rotate.

Turning to FIGS. 3 and 4, the vertical magnet assembly 56 is shown as it is affixed near the end of the shaft 16. The vertical magnet assembly 56 includes an annular plate 80 which is affixed to the shaft 16, and a hexagonal plate 82 is affixed to shaft 16 immediately to the left of the plate 80 and abutting the plate 80. The shaft 16 is located substantially in the center of the plates 80 and 82. It should be understood that the annular plate 80 and the hexagonal plate 82 are affixed to the shaft 16 so that they rotate therewith, and are affixed so that they do not move with respect to the shaft 16. Three magnets 86 are affixed one to every other of the faces of the hexagonal plate 82, and the magnets 86 have their south poles oriented outwardly. Three magnets 88 having their north poles oriented outwardly are affixed to the faces of the hexagonal plate between the magnets 86. That is, the magnets 86 and 88 are spaced alternately around the hexagonal plate 82. The magnets 86 and 88 are somewhat narrower than the faces of the hexagonal plate 82 so that the magnets do not abut one another.

In practice the material forming magnets 86 and 88 is anisotropic, rather than isotropic. Isotropic materials can be magnetized equally well along any axis, while aniostropic materials can be magnetized better along one particular axis. Anisotropic materials are used for magnets 86 and 88 so that they can be magnetized to have a very high field strength which is required for effective operation of the system. Generally speaking, anisotropic materials can be magnetized to have a substantially greater field strength than isotropic materials. For example, the energy product of some anisotropic materials can be as high as about $16 \times 10^6$ Gauss-Oersteds; whereas the maximum field strength achievable with isotropic materials is generally about $4 \times 10^6$ Gauss-Oersteds. One example of a magnet which is suitable for the present system is a cobalt rare earth magnet sold by Permag Pacific Corporation, catalog number 90530A.

Turning to FIGS. 5–7, the horizontal magnet assemby 70 is illustrated. The horizontal magnet assembly 70 is formed in the propeller shaft 62 by drilling three holes, 92, 94 and 96 in the shaft 62. The holes 92 and 96 have their axes parallel, and the hole 94 is located between the holes 92 and 96 and has its axis 90° from the holes 92 and 96. In the leftmost hole 92, there are inserted two disc-shaped magnets 100 and a disc 101 of magnetic flux-carrying material between the two magnets. The two magnets are oriented so that both have their north poles upward. Thus it should be appreciated that the north pole of the uppermost magnet is exposed, and the south pole of the lowermost magnet is exposed. The two magnets 100 and the disc 101 disposed in the hole 92 form a first magnet array 102.

A third magnet array 106 formed likewise of two magnets and a magnetic disc is disposed in hole 96. However, the third magnet array 106 has the poles of the magnets 100 disposed so that the south poles of the magnets are upward, thereby exposing the south pole of the uppermost magnet and the north pole of the lowermost magnet. A second magnet array 104 is formed in the middle hole 94. The second magnet array 104 is formed of three magnetic discs 100 with each of the north poles located to the left as shown in FIG. 7. Thus it should be appreciated that the second magnet array 104 has a south pole exposed in FIG. 6, and as shown in FIG. 7 a south pole is exposed on the left side and a north pole exposed on the right side. It should be understood that the purpose of utilizing three magnets 100 in the magnet array 104 is to insure that the field strength of the magnet array 104 is substantially greater than that of the magnet arrays 102 and 106.

In practice the material forming magnets 100 is anisotropic, rather than isotropic and can be the same material as used for the magnets 86 and 88. Anisotropic materials should be used for the magnets 100 because a high energy product is important for the proper operation of the system.

Figure 8:
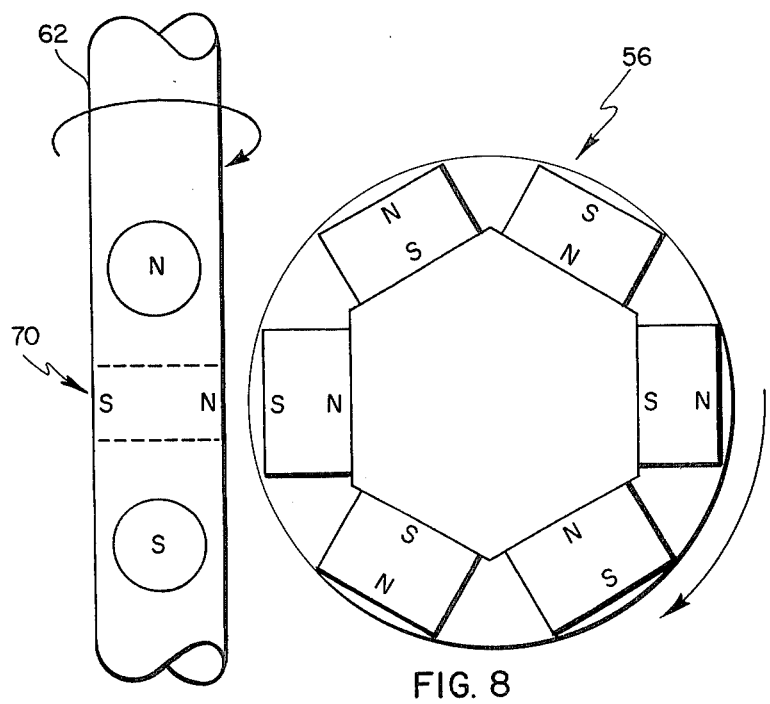
FIG. 8 is a schematic illustration of the parts shown in FIGS. 3–7 illustrated in the relationship they have in the operating embodiment.
Figure 9:
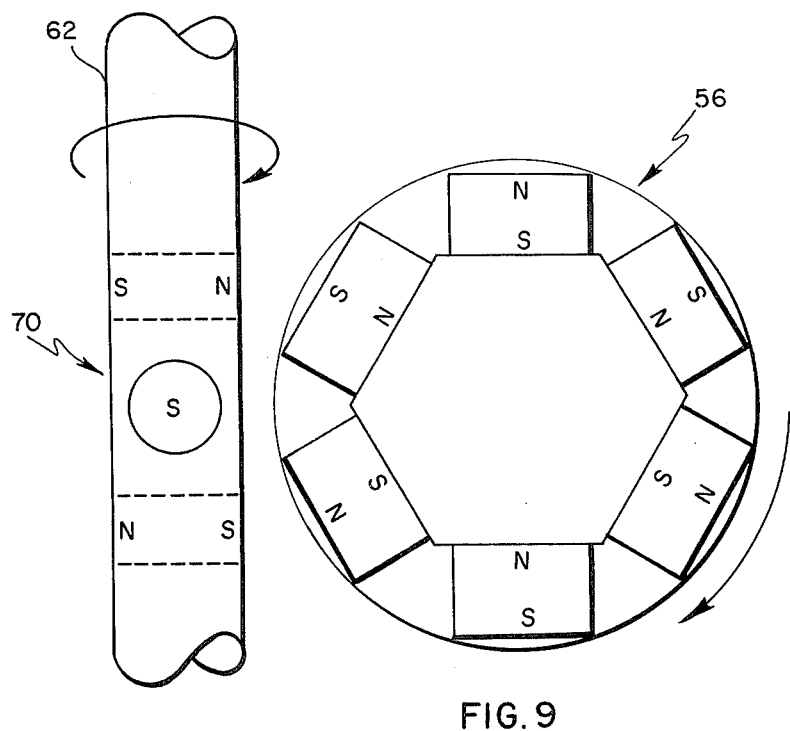
FIG. 9 is similar to FIG. 8, but showing the elements in a different orientation.

FIGS. 8 and 9 illustrate the horizontal magnet assembly 70 and the vertical magnet assembly 56 as they are oriented in the operation of the device. The two assemblies 56 and 70 are located such that their magnetic fields interact with one another. It should be appreciated that in practice the plug 50 is disposed between the two magnet assemblies 56 and 70; however, for the purposes of clarity the plug 50 is not shown in FIGS. 8 and 9. It can now be seen that when the horizontal assembly 70 is rotated according to the arrows in FIGS. 8 and 9, the interaction of the magnetic fields imparts torque to the vertical magnet assembly 56 causing it to rotate clockwise as shown. That is, the uppermost north pole of assembly 70 moves closer to the assembly 56 thereby repelling the north pole of assembly 56 located in the 11 o'clock position, as shown in FIG. 8 and urging it to the 12 o'clock position as shown in FIG. 9. thereby attracting the South pole at 9 o'clock of Assembly 56. Likewise, the lowest south pole of assembly 70, shown in FIG. 8 moves closer to assembly 56 thereby repelling the south pole at 9 o'clock of the assembly 56 and attracting the north pole at 7 o'clock thereby urging the assembly 56 into the position shown in FIG. 9. Likewise the other magnets of assemblies 70 and 56 interact to cause the assembly 56 to rotate.

An important feature of the present device can now be understood. In practice the flowmeter can be installed in a pipe by affixing the cover plate 10 to the pipe. When the counter assembly 14 or the magnet assembly 56 must be repaired, the screws 34 can be detached thereby permitting the assemblies 14 and 56 to be lifted from the flowmeter. It can be understood that the magnet assembly 56 is spaced apart from the magnet assembly 70, and the two assemblies are not mechanically coupled to one another. Therefore the assembly 70, and the parts of the flowmeter to which it is coupled can remain installed in the pipe while the counter assembly 14 and magnet assembly 56 are removed for repair or replacement. Moreover, the plug 50 forms a liquid-impervious seal between the two magnet assemblies 56 and 70 so that even if there is liquid in the pipe and within the horizontal member 42, the magnet assembly 56 can nevertheless be removed without disturbing the magnet assembly 70, or removing the flowmeter from the pipe. An additional advantage of the liquid-impervious seal formed between the first and second magnet assemblies 56 and 70 is that during operation of the flowmeter the interior of the vertical member 40 is kept dry thereby preventing damage to the delicate mechanism of the counter. This is true even though liquid flows through the interior of the horizontal member 42.

The operation of the device shown in FIGS. 1 and 2 can now be understood. The cover plate 10 is affixed to a pipe or other similar channel so that the gear enclosure extends into liquid flowing in the channel. The flowing liquid causes propeller 72 to rotate thereby causing propeller shaft 62 to rotate. The rotation of the propeller shaft 62 and magnet assembly 70 imparts rotation to the magnet assembly 56 thereby causing the vertical shaft 16 to rotate. Rotation of the vertical shaft 16 operates the counter assembly 14 which indicates the quantity of flow through the channel or pipe.

It should be understood that the flowing liquid can contain pockets of gas or pieces of solid material. These discontinuities in the flow often cause the propeller to experience substantial accelerations. Consequently, it is important that the propeller 72 and the counter assembly 14 be tightly coupled. That is, even when the propeller experiences substantial accelerations, the counter should accurately reflect the number of rotations of the propeller. Another way of stating this is that there should be no "slipping" between the magnet assemblies 70 and 56. It should be understood that the presently described system insures that there is no substantial "slipping" between the two magnet assemblies 70 and 56. It can be seen that for each rotation of the propeller shaft 62 the vertical magnet assembly 56 rotates only one-third turn. Because of this so-called "step-down" gearing, the propeller shaft 62 provides a substantial amount of torque to the vertical shaft 16 thereby insuring that even if substantial accelerations are experienced by the propeller, the vertical shaft assembly 16 nevertheless does not "slip" relative to the propeller shaft assembly 62.

Figure 10:
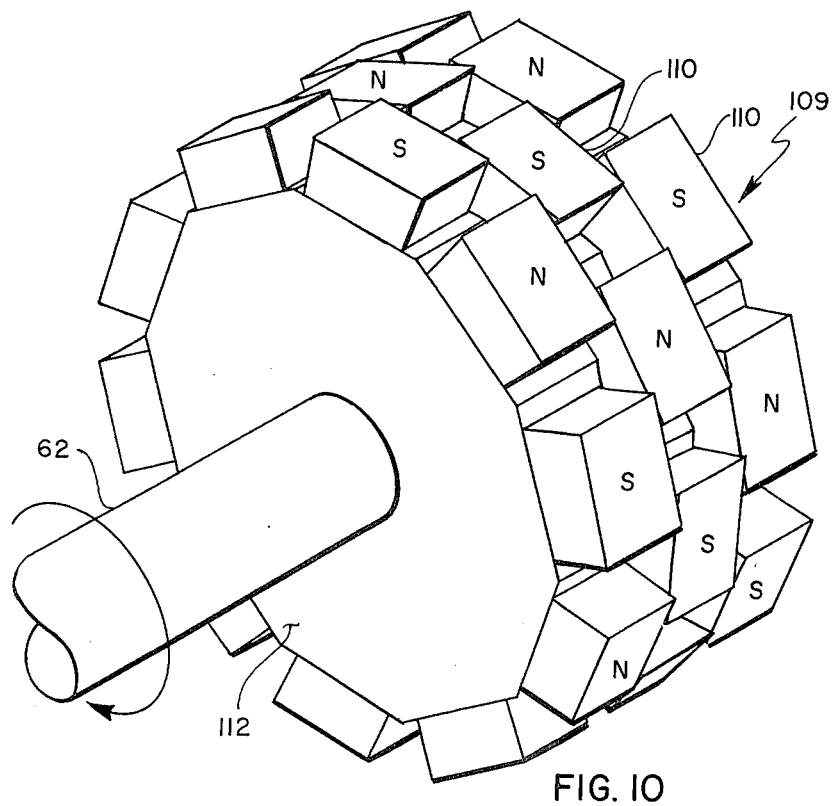
FIG. 10 is a detail of part of a device according to another embodiment of the present invention.
Figure 11:
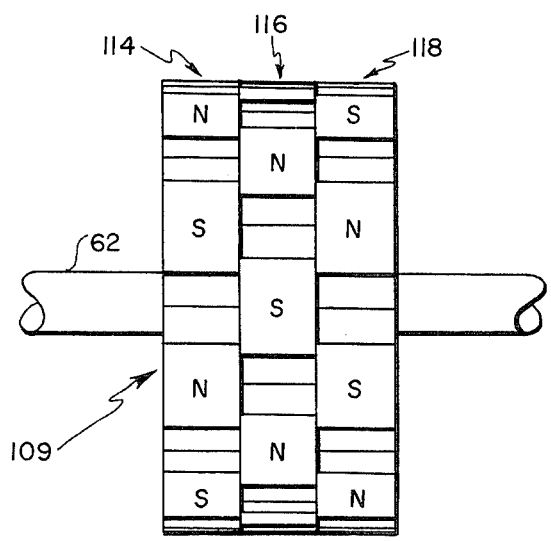
FIG. 11 is another view of the detail shown in FIG. 10.

Another embodiment of the horizontal magnet assembly is illustrated in FIGS. 10 and 11. The horizontal magnet assembly 109 according to this embodiment includes a plurality of magnets 110 disposed around the propeller shaft 62. In particular, a support member 112 formed as a prism having 10 faces is affixed to the propeller shaft 62 to rotate therewith. A plurality of rectangular magnets 110 are affixed to the faces of the support member 112 with the north pole of each magnet 110 either adjacent the support member 112 or facing away from the support member. The magnets 110 are spaced apart in a substantially circular array so that each magnet with its north pole facing outward is adjacent to two magnets with their south poles facing outward. Thus, a pluarlity of magnets 110 form a first array of magnets 114.

Immediately to the right and adjacent to the first array of magnets 114 is a second support member 112. A second array of magnets 116 is constructed substantially the same as the first array of magnets 114 and affixed to the second support member 112. The magnets 110 forming the second array of magnets 116 are located substantially between the magnets forming the first array 114. A third support member 112 is affixed in abutting relationship with the second support member 112, and a third array of magnets 118 is affixed to the third support member 112. The third array of magnets 118 is oriented so that the magnets of the array are located substantially between the magnets of the second array.

It should be understood that the magnets forming the third array are substantially aligned with the magnets forming the first array 114, with respect to the axis of the propeller shaft 62. In contrast, the magnets 110 forming the second array of magnets 116 are not in the same line as the magnets forming the arrays 114 and 118. It can be seen that the locus of the south poles of the magnets form, generally, a plurality of helices disposed around the magnet assembly 109. Likewise, the locus of the north poles of the magnets form, generally, a plurality of helices spaced between the locus of south poles around the assembly 109. The locus of north poles and the locus of south poles are parallel to one another.

The operation of the device illustrated in FIGS. 10-11 can now be understood. In practice the assembly 109, affixed to the propeller shaft 62, is installed in place of the assembly 70 as shown in FIGS. 1 and 2. Thus, as the shaft 62 rotates clockwise according to FIG. 10, the shaft 16 is driven to rotate clockwise as well. For every six revolutions of the propeller shaft 62 the vertical shaft 16 rotates ten revolutions. Other gear-ratios can be provided by varying the number of magnets and their spacing.

We claim:

1. A fluid flowmeter having a propeller which is rotated by flowing fluid and a counter which indicates the quantity of fluid which has rotated the propeller, the flowmeter comprising:
   a. first magnet assembly means coupled to rotate to drive the counter, said first magnet assembly means including a plurality of magnets located with the locus of their north poles forming a circle and a plurality of magnets with the locus of their south poles located substantially in the same circle;
   b. second magnet assembly means coupled to rotate with the propeller, said second magnet assembly means including a plurality of magnets have the locus of their north poles arranged to form a helix and the locus of their south poles arranged to form a second helix spaced apart from the helix formed by the locus of north poles, the second magnet means located so that it magnetically influences the first magnet means and rotation of the second magnet means induces the first magnet means to rotate; and,
   c. means disposed between said first and second magnet assemblies to form a liquid-impervious seal therebetween;
   whereby said first magnet assembly means can be removed from the flowmeter without removing said second magnet assembly means.

2. A flowmeter according to claim 1 wherein the magnets of said second magnet assembly means have their north poles arranged to form a plurality of helices and their south poles arranged to form a plurality of helices, so that each helix formed by a locus of north poles is formed between a locus of south poles.

3. A flowmeter according to claim 1 wherein said second magnet assembly means includes a shaft with ports formed therein and a plurality of magnets affixed in said ports.

4. A flowmeter according to claim 3 wherein said second magnet assembly means includes:
   a. three ports formed in the shaft of the propeller and spaced apart from one another, two of said ports having their axes parallel and the third port formed between the other two ports, with the axis of the third port oriented 90° from the axes of the first two ports; and,
   b. two magnets disposed in each of the two parallel ports and three magnets disposed in the third port so that the magnetic field produced by the magnets in said third port is stronger than the magnetic fields produced by the magnets in each of the other two ports.

5. A fluid flowmeter having a propeller which is rotated by flowing fluid and a counter which indicates the quantity of fluid which has rotated the propeller, the flowmeter comprising:
   a. substantially vertical shaft coupled to said counter;
   b. a substantially horizontal plate coupled to the vetical shaft and spaced apart from said counter, with said vertical shaft located substantially in the center of said plate;
   c. a first magnet assembly means including a pluarlity of magnets affixed to said horizontal plate with a first half of said magnets having their north poles facing away from said vertical shaft and the second half of said magnets having their south poles facing away from said vertical shaft, the locus of said north poles forming a circle and the locus of said south poles located substantially in the same circle, and each of said magnets of said first half separated from one another by one of said magnets of said second half;
   d. a substantially horizontal shaft coupled to the propeller;
   e. second magnet assembly means coupled to the shaft of the propeller, said second magnet assembly means including a plurality of magnets having the locus of their north poles arranged to form a helix and the locus of their south poles arranged to form a second helix, said second magnet assembly means located so that it magnetically influences the first magnet assembly means, and rotation of the second magnet assembly means induces the first magnet assembly means to rotate, said second magnet assembly means being located spaced-apart from said first magnet assembly means a sufficient distance to permit liquid-impervious means to be disposed between said first and second magnet assembly means; and,
   f. means disposed between said first and second magnet assembly means and substantially surrounding said first magnet assembly means to form a liquid-impervious seal between said first and second magnet assembly means;
   whereby said first magnet assembly means can be removed from the flowmeter without removing said second magnet assembly means.

6. A flowmeter according to claim 5 wherein,
   a. said vertical shaft and said horizontal plate with said plurality of magnets affixed thereto are disposed inside a first enclosure;
   b. said second magnet assembly means is disposed inside a second enclosure; and,
   c. liquid-impervious means is formed between said first and second enclosure means so that liquid inside said second enclosure cannot enter said first enclosure.

7. A flowmeter according to claim 5 wherein said liquid-impervious means includes a substantially cylindrical plug located between said first and second magnet assembly means

* * * * *